Patented Jan. 11, 1949

2,458,888

UNITED STATES PATENT OFFICE 2,458,888

ACRYLIC ESTERS OF ETHER-ALCOHOLS

Chessie E. Rehberg, Glenside, and Charles H. Fisher, Abington, Pa., assignors to the United States of America as represented by the Secretary of Agriculture No Drawing. Application March 5, 1946,
Serial No. 652,214

5 Claims. (Cl. 260—83)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a continuation in part of our copending application for patent, Serial No. 545,653, filed July 19, 1944, granted as Patent No. 2,396,434.

This invention relates to monomeric and polymeric acrylic esters of mono-ethers of glycol and diglycol, especially those wherein the glycol mono-ether is either an aryl or aralkyl ether of diglycol, or a branched-chain ether of glycol or diglycol. These esters may be represented by the formula $$CH_2:CRCOO[CH_2CH_2O]_nR'$$

wherein R is hydrogen or methyl, R' is aryl, aralkyl or a branched-chain alkyl group, and $n$ is an integer from 1 to 2, $n$ being 2 when R' is aryl or aralkyl. Among the esters included in this group may be mentioned the esters of acrylic and methacrylic acid derived from the phenyl, benzyl, phenethyl, chlorophenyl, xylyl, chlorobenzyl, methoxybenzyl, and similar mono-ethers of diglycol and those derived from the isopropyl, isobutyl, 2-ethylbutyl, 2-ethylhexyl, and similar branched chain alkyl mono-ethers of glycol or diglycol. The esters herein contemplated may be conveniently prepared by treatment of the glycol mono-ether with the acrylic acid or its anhydride or acyl halide, or by the alcoholysis of a lower alkyl ester of the acrylic acid by the ether-alcohol.

The esters of acrylic acid generally polymerize with much greater ease than do those of methacrylic acid. Furthermore, the ether-esters which are the products of the present invention polymerize much more readily than do the simple alkyl esters of the same acid. This is especially true of the esters of the mono-ethers of diglycol, since they polymerize more readily than the corresponding derivatives of glycol itself. Hence, much difficulty is encountered in the preparation, preservation, and use of the esters herein disclosed. However, by use of suitable precautions herein disclosed, they were minimized or eliminated.

In the preparation of the monomers it was found to be very important to use pure reagents, free of glycols and peroxides; to rigidly exclude air from the apparatus, particularly in the vacuum distillation of the monomeric esters, and to distill the esters at relatively low temperatures, preferably not higher than 80° to 100° C. The monomeric esters can be stored indefinitely without addition of any inhibitor if kept refrigerated at about 0° C.

The monomeric esters may be polymerized by any of the methods commonly used in the art. For instance, they may be polymerized in mass, in a suitable organic solvent, or in an aqueous emulsion. Suitable catalysts include heat, light, peroxides and per-salts, or any combination of these. We generally prefer to conduct the polymerization at a temperature between about 40° and 120° C., although others may be used. The polymers thus obtained are generally soft and rubbery, and are soluble in the usual solvents such as esters, ketones, aromatic hydrocarbons, and halogenated aliphatic hydrocarbons. Films, coatings, and laminations may be prepared from solutions or aqueous emulsions of the polymers by methods well known in the art.

A remarkable property possessed by the polymeric esters herein disclosed is that exposure to air or oxygen, especially at elevated temperatures or in the presence of certain catalysts, results in their conversion from a soft, rubbery, soluble, thermoplastic resin to a hard, glossy, flexible, non-thermoplastic, thermoset resin which is completely insoluble in the usual organic solvents. This transition apparently involves the absorption of oxygen and is accelerated by the presence of organic peroxides or metallic paint driers such as cobalt salts. Heat alone effects the transformation, suitable temperatures being about 75° to 200° C. The time required varies with the particular ester used, the temperature, and the catalyst, if any. At 120° C. about 20 to 120 minutes is required without catalyst. The rate of cure is roughly doubled by the use of a trace of cobalt naphthenate.

The preparation, polymerization, and curing of these esters are illustrated by the following examples:

EXAMPLE I

PREPARATION OF MONOMERIC ISOPROPOXYETHYL
ACRYLATE (ALCOHOLYSIS METHOD)

Monomeric isopropoxyethyl acrylate was prepared from glycol mono-isopropyl ether (isopropyl Cellosolve) and ethyl acrylate according to the following procedure.

One kg. of the glycol mono-isopropyl ether, 3 kg. of ethyl acrylate, 100 g. of hydroquinone (polymerization inhibitor), and 10 g. of sulfuric acid (catalyst) were mixed in a 5-liter flask attached to a 2" x 3' fractionating column. The charge was refluxed, the still-head and take-off being arranged and operated so that distillation of the ethanol-ethyl acrylate azeotrope (B. P. 76° C.) removed the ethanol as rapidly as it was formed. When no more ethanol was produced (10 to 12 hr.), the still was cooled and the excess ethyl acrylate was distilled at about 35° (75 mm.). The product was then distilled at about 55° (5 mm.).

EXAMPLE II

PREPARATION OF MONOMERIC ISOPROPOXYETHYL METHACRYLATE (ACID ANHYDRIDE METHOD)

Three hundred eight grams of methacrylic anhydride was added slowly with stirring to 229 g. of isopropoxyethanol (isopropyl Cellosolve) containing 20 g. of hydroquinone and 2 g. of sulfuric acid, the mixture being maintained at 60° to 100° C. during the addition.

After standing overnight at room temperature, the mixture was distilled under reduced pressure, the isopropoxyethyl methacrylate being collected at about 73° (6 mm.).

Obviously, the acid chloride could have been used instead of the anhydride, or the ester could have been made by the alcoholysis method described in Example II.

Although the above examples show the formation of only two esters, others may be produced according to the invention. Following the procedure of Example I, except for substitution of the reactants, the esters indicated in the table (below) as Examples III to VI were produced, the table indicating the physical properties of the formed esters of all the examples.

Table.—Monomeric esters

| Example | Ester | B. P. °C. | B. P. mm. Hg | $[N]_D^{-20}$ | $[d]_4^{-20}$ | Yield, percent |
|---|---|---|---|---|---|---|
| I | Isopropoxyethyl acrylate | 82 | 19 | 1.4258 | .9549 | 95 |
| II | Isopropoxyethyl methacrylate | 73 | 6 | 1.4278 | .9430 | 65 |
| III | 2-Ethylhexoxyethyl acrylate | 87 | 0.5 | 1.4408 | .9215 | 90 |
| IV | 2-Ethylhexoxyethoxyethyl acrylate | 126 | 0.4 | 1.4510 | .9685 | |
| V | Phenoxyethoxyethyl acrylate | 145 | 2.2 | 1.5108 | 1.1103 | 88 |
| VI | Isopropoxyethoxyethyl acrylate | 75 | 0.5 | 1.4352 | 1.002 | |

The following examples exhibit polymerization of the monomeric esters of Examples I to VI.

EXAMPLE VII

SOLUTION POLYMERIZATION

Fifty grams of monomer and 0.5 g. of benzoyl peroxide were dissolved in 75 g. of ethyl acetate. Other solvents such as toluene or acetone may be substituted for the ethyl acetate. The mixture was refluxed with stirring. Polymerization began almost immediately, and the heat liberated was sufficient to maintain boiling without external application of heat. When the reaction subsided, heat was applied to maintain gentle refluxing for 3 hours. The solutions thus obtained were sirupy liquids suitable for application to surfaces by dipping or brushing.

EXAMPLE VIII

EMULSION POLYMERIZATION

Fifty grams of monomer, 75 g. of water, and 2 g. of emulsifying agents (soap, sodium alkyl sulfate, and so forth) were stirred together while heated in a steam bath. When hot, 1 cc. of 1 percent solution of ammonium persulfate in water was added, and heating was continued. Polymerization began in 5 to 15 minutes and was complete in ½ to 2 hours. Very little polymer coagulated, and the emulsion could be stored indefinitely without change. The resin in the emulsion could be coagulated by addition of brine, acid, or other reagents commonly used for the purpose, depending on the particular emulsifier used. The resin could be dissolved in organic solvents, provided that it had not been unduly exposed to air in drying.

EXAMPLE IX

MASS POLYMERIZATION

When bottles containing the monomer were left at room temperature for a few days, polymerization occurred. When warmed to 50° to 80° C., the monomer polymerized much more quickly. The polymers thus obtained were usually soft, tacky, elastic and rubbery, and were soluble in ethyl acetate, toluene, and other organic solvents. The solutions thus obtained were much more viscous than those obtained by conducting polymerization in the solvent, indicating a higher molecular weight in the mass polymer.

It is evident that the polymerization procedures outlined above may be varied considerably by those skilled in the art. For instance, other catalysts, solvents, emulsifiers, or temperatures may be used. Furthermore, any of these esters may be copolymerized in any proportion with other vinyl type monomers such as butadiene, styrene, acrylonitrile, vinyl acetate, vinyl chloride, vinylidene chloride, alkyl acrylates and methacrylates and, of course, with each other.

For such copolymerizations it is sufficient to mix the monomers in the desired proportions and then conduct the polymerization in the usual fashion. The properties of such copolymers will depend on the type and proportion of the other monomer or monomers used and in general, will be intermediate between those of the polymers produced from the monomers when used separately.

EXAMPLE X

The change whereby the soft, tacky, soluble, thermoplastic resin is converted into a relatively hard, glossy, non-tacky, thermoset resin which is completely insoluble in organic solvents, is referred to herein as curing. This process requires oxygen, and when the oxygen is supplied by the air, only the surface of the polymer is greatly affected. Large masses or thick sheets of the resin, when subjected to the curing process, develop a thin surface layer of cured resin which protects the interior of the mass. For this reason thin films, sheets, or coatings are most suitable unless it is desired to have only a surface cure over a soft interior.

An unsupported, cured film of isopropoxyethyl acrylate was prepared by using a solution of the polymer in ethyl acetate prepared as in Example III. A glass plate was wet with soapy water, allowed to dry, then coated with the resin solution. After evaporation of the solvent, the film was cured by baking overnight at 100° C. The film was then removed from the plate by soaking in water, inverted, and again baked overnight at 100° C. This resulted in a film cured on both sides, highly resistant to organic solvents, non-tacky, with good gloss, very flexible, transparent, and almost colorless. During several days of further baking at 100° C., it gradually hardened until finally it cracked when sharply creased.

Panels of glass, wood, copper, brass, and stainless steel were coated with various resins of the group listed in the table, using samples made by each of the techniques described in Examples VII to IX. The coatings were applied by dipping, spreading, or brushing, and when dry, were cured in an oven. In every case, the resin cured, as evidenced by hardening, loss of tack and insolubility in organic solvents. Rates of cure varied widely with different resins, temperatures, and catalysts. The methacrylate was slightly slower than the corresponding acrylate. The esters containing aryl groups were slower than the others. Those containing branched chain alkyl groups were faster than the comparable ones containing only straight chain alkyl groups. Incorporation of benzoyl peroxide (5 percent based on resin) increased the rate of cure. A few thousandths percent of cobalt (as naphthenate) accelerated the cure even more. With the latter catalyst the more active resins, such as isopropoxyethyl acrylate, could be cured to the tack-free state in 10 minutes at 100° C. Longer baking or higher temperature improved the hardness of the film.

All the samples showed very good adhesion of both the uncured and the cured coating. Immersion of the cured specimens for 24 hours in water, alcohol, acetone, toluene, gasoline, or ethyl acetate failed to loosen, dissolve, or cloud the film or to render it tacky. Likewise, heating to 175° C. fails to make them tacky.

Instead of baking in an oven, the resins may be cured by irradiation with ultra-violet or infra-red light, by electronic heating, or by other known means.

Having thus described our invention, we claim:

1. A monomeric ester having the formula $CH_2:CRCOO[CH_2CH_2O]_nR'$, wherein R is selected from the group consisting of hydrogen and methyl, R' is a branched chain alkyl, and $n$ is an integer from 1 to 2.

2. A non-thermoplastic, organic-solvents insoluble polymer of an ester having the formula $CH_2:CRCOO[CH_2CH_2O]_nR'$, wherein R is selected from the group consisting of hydrogen and methyl, R' is a branched chain alkyl, and $n$ is an integer from 1 to 2.

3. Isopropoxyethyl acrylate.
4. Isopropoxyethyl methacrylate.
5. Isopropoxyethoxyethyl acrylate.

CHESSIE E. REHBERG.
CHARLES H. FISHER.

REFERENCES CITED

The following references are of record in the file of this patent:

UNITED STATES PATENTS

| Number | Name | Date |
| --- | --- | --- |
| 1,943,972 | Izard | Jan. 16, 1934 |
| 2,129,694 | Izard | Sept. 13, 1938 |
| 2,215,219 | Haux | Sept. 17, 1940 |
| 2,268,611 | Mitchell | Jan. 6, 1942 |
| 2,316,274 | Mitchell | Apr. 13, 1943 |